S. A. & L. C. GRANT.
TRACTION MACHINE.
APPLICATION FILED OCT. 20, 1911.
1,034,907.
Patented Aug. 6, 1912.
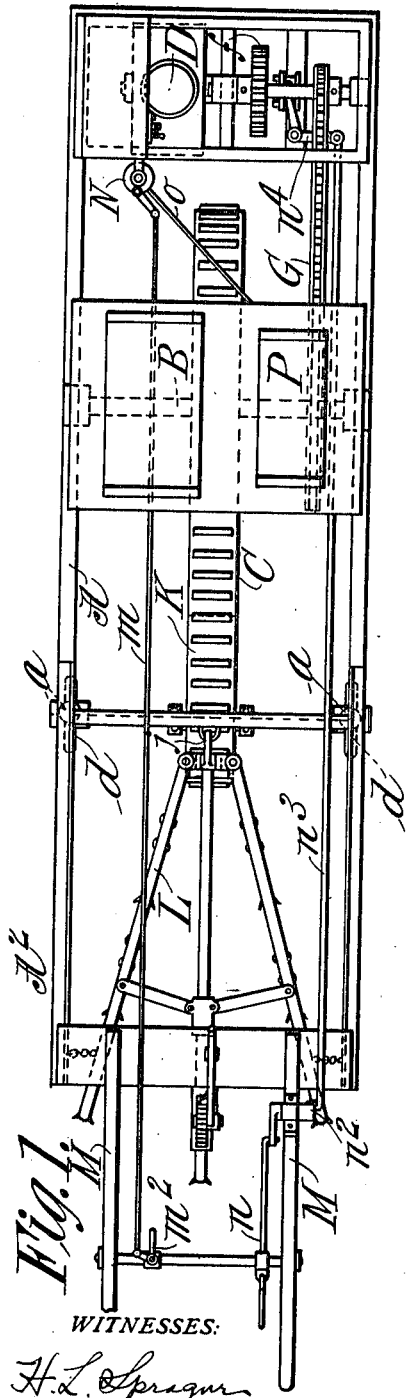
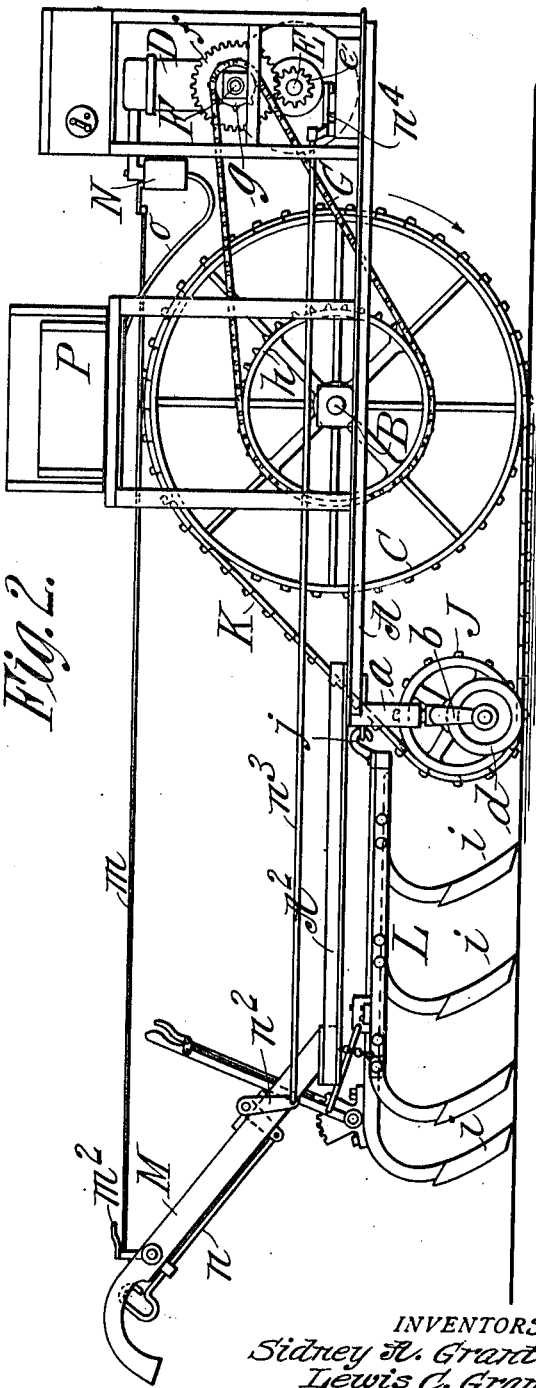
WITNESSES:
INVENTORS,
Sidney A. Grant, and
Lewis C. Grant.
BY
ATTORNEY.

UNITED STATES PATENT OFFICE.

SIDNEY A. GRANT AND LEWIS C. GRANT, OF THOMPSONVILLE, CONNECTICUT.

TRACTION-MACHINE.

1,034,907.                    Specification of Letters Patent.       Patented Aug. 6, 1912.

Application filed October 20, 1911. Serial No. 655,722.

*To all whom it may concern:*

Be it known that we, SIDNEY A. GRANT and LEWIS C. GRANT, citizens of the United States of America, and residents of Thompsonville, in the county of Hartford and State of Connecticut, have invented certain new and useful Improvements in Traction-Machines, of which the following is a full, clear, and exact description.

The object of this invention is to provide a traction machine, comprising an engine or motor for the propulsion thereof, which machine is especially well adapted for carrying and subjecting to operative action any suitable implements or tools such as cultivators or soil or ice plows, and which machine by reason of certain appliances comprised therein is of greatly increased tractional effect so that without any undue waste of power, and notwithstanding the resistance which may be imposed by the penetration into and movement through soil or ice by blades, plows or tools, there will be no slipping of the machine, but on the other hand a certainty of its forward travel.

Other objects are attained in and by the construction and arrangement of the parts as will hereinafter appear.

The invention is described in conjunction with the accompanying drawings and is set forth in the claims.

In the drawings:—Figures 1 and 2 are respectively a plan view and a side elevation of our improved machine.

In the drawings, A represents a substantially horizontal frame having at an intermediate portion thereof a shaft B mounted in suitable journal bearings thereon and having fixed on such shaft, about midway between the opposite sides of the frame, a comparatively large traction wheel C. The frame forward of the wheel C has an engine or motor D and its equipments mounted thereon; and the frame, about as far to the rear of the wheel C as the engine is forward thereof has the depending pedestals $a$ $a$ in which are fitted the hangers $b$ $b$ for comparatively small caster wheels or rollers $d$ $d$.

E, Fig. 2, represents the engine shaft having a small spur gear or pinion $e$ thereon which meshes into a larger spur gear wheel $f$ on a countershaft F above the engine shaft; and on this countershaft is also affixed a sprocket wheel $g$ which runs a sprocket chain G which also runs around a larger sprocket wheel $h$ affixed on the traction wheel shaft B.

In a suitable depending support centrally of the frame A at a considerable distance to the rear of wheel C, is an idler wheel J, the lower peripheral surface of which is approximately at the ground level, the same as is the lower peripheral surface of the large wheels C; and around both of these wheels, in suitable tension is run an endless flexible element K herein termed a "band"; but it may be, as a matter of preference or selection, either an endless belt or an endless chain, the same being one preferably of considerable width so as to have a comparatively broad surface bearing and also considerable lengthwise bearing on the ground between the bottom of the large traction wheels C and the bottom of the idler wheel J.

In the operation of the machine, the engine running, the axle B will, through the driving connections shown, be rotated and with it the large wheel C and successive portions of the band K will be laid down on the ground to form between the bottoms of the wheels C and J a track which is immovable relatively to the ground, having comparatively long bearing thereon and great frictional engagement therewith. And the turning action of the large wheel C is effective for the propulsion of the machine or vehicle relatively to the band, the wheel C as it advances laying down new portions of such band while under the advance of the machine as great a portion of the band as is newly laid down in advance of the large wheel C is gathered up, carried around the idler J and then forwardly moved to and around the large wheel C.

From the foregoing it is to be understood, and it is here emphasized that the lower course or portion of the band between the bottoms of the wheels C and J has no progressive movement on the ground. In other words, it is stationary relative to the ground and affords a medium of frictional contact with the latter for the length of the entire horizontally laid portion thereof and forms a resistant of the stated length which is not liable, by reason of its long bearing surface on the ground, to slide or slip rearwardly and relatively to which the large wheel C is coöperative for the most effective forward propulsion of the vehicle or machine as a whole.

The frame A is provided with a rearward frame extension A² provided with rearwardly and upwardly projecting handles M for the guidance of the power propelled machine; and inasmuch as it is desirable at times to lift the rear portion of the machine, such action in this machine is permitted to be accomplished by the exercise of but slight power by reason of the counterbalancing effect of the motor and its equipments which are located forward of the wheel C, the axle for which constitutes a fulcrum for the lever like frame A, A².

Although under the present invention we are not limited to any particular type of engine or motor nor to the means for the controlling of the same, nor to the tools or implements which are carried thereby, it will be pointed out in the present illustrations that an operating rod $m$ is connected with the carbureter N for throttling the same, such rod having an operating bell crank lever $m^2$ pivotally mounted on the handle frame at the rear of the machine. There is also mounted on the handle frame at the rear of the machine a manually operable thrust rod $n$ which by the bell crank $n^2$ has operative connection with the long lengthwise extending rod $n^3$, the forward end of which is connected with a clutch operating lever $n^4$ through means of which the engine driving shaft may be rendered nonoperative for the propulsion of the traction wheel C.

P represents a gasolene tank and $o$ a pipe connecting it with the carbureter of the engine D, here understood as of the gasolene type with provisions, as usual, for the ignition of the gaseous charges introduced thereinto.

We claim:—

1. In combination, a frame adapted to carry a plow at the rear end thereof, an axle mounted intermediate of the ends of said frame, a traction wheel journaled on the axle, handles mounted on the rear end of said frame, a wheel journaled below the frame and intermediate of the handles and the traction wheel, and a traction band movable over the wheels.

2. In combination, a frame adapted to carry a plow at the rear end thereof, an axle mounted intermediate of the ends of said frame, a traction wheel journaled on the axle, plow handles mounted on the rear end of said frame, a wheel journaled below the frame and intermediate of the handles and traction wheel, and a traction band movable over the wheels, and adapted to engage the ground below said wheels, and to have its portion engaging with said intermediate wheel elevated, when the rear end of the frame is tilted upwardly.

3. In combination, a frame having handles on its rear end and adapted to carry a plow on said rear end, an axle located intermediate of the ends of the frame, a traction wheel journaled on the axle, and supporting the frame for tilting, a wheel located below the frame and rearwardly of the traction wheel, a traction band movable over the wheels, a motor mounted on the frame forwardly of the traction wheel, a driving connection between the motor and the traction wheel, controlling means for said motor including a rod extending rearwardly to the handles, and means arranged on said handles for operating said rod.

4. In combination, a frame having handles on its rear end and adapted to carry a plow on said rear end, an axle mounted on said frame intermediate of its opposite ends, a traction wheel on the axle, a wheel located below said frame rearwardly of the traction wheel, a traction band movable over the wheels, a motor mounted on the forward end of the frame and adapted to balance the rear end thereof when said rear end is weighted with a plow, a driving connection between the motor and the traction wheel, a clutch for controlling said connection, a controller for the motor, and operating means extending rearwardly to the handles for said clutch and controlling means.

Signed by us at Springfield, Mass., in presence of two subscribing witnesses.

SIDNEY A. GRANT.
LEWIS C. GRANT.

Witnesses:
Wm. S. Bellows,
G. R. Driscoll.